United States Patent [19]

Ewer, deceased et al.

[11] Patent Number: 4,806,010

[45] Date of Patent: Feb. 21, 1989

[54] MULTIFOCAL LENS

[75] Inventors: Ronald W. Ewer, deceased, late of Meadows; Dean G. Scott, legal representative, Adelaide; Kevin D. O'Connor, Longwood, all of Australia

[73] Assignee: Pilkington Visioncare Holdings, Inc., Menlo Park, Calif.

[21] Appl. No.: 932,369

[22] Filed: Nov. 19, 1986

[30] Foreign Application Priority Data

Nov. 19, 1985 [GB] United Kingdom ............... 8528460

[51] Int. Cl.⁴ ............................................. G02C 7/06
[52] U.S. Cl. ..................................... 351/169; 351/172
[58] Field of Search ................................ 351/168–172

[56] References Cited

U.S. PATENT DOCUMENTS

| | | |
|---|---|---|
| 2,869,422 | 1/1959 | Cretin-Maitenaz ................. 351/169 |
| 3,563,057 | 2/1971 | Rosenbauer ......................... 351/169 |
| 4,055,379 | 10/1977 | Winthrop ............................ 351/169 |
| 4,056,311 | 11/1977 | Winthrop ............................ 351/169 |
| 4,062,629 | 12/1977 | Winthrop ............................ 351/169 |
| 4,315,673 | 2/1982 | Guilino et al. ...................... 351/169 |
| 4,461,550 | 7/1984 | Legendre ............................ 351/169 |
| 4,472,036 | 9/1984 | Kitani ................................. 351/169 |
| 4,537,479 | 8/1985 | Shinohara et al. ................... 351/169 |

FOREIGN PATENT DOCUMENTS

| | | | |
|---|---|---|---|
| 0027339 | 4/1981 | European Pat. Off. ............ | 351/169 |
| 0039544 | 11/1981 | European Pat. Off. ............ | 351/169 |
| 0132955 | 2/1985 | European Pat. Off. ............ | 351/169 |
| 2439127 | 2/1975 | Fed. Rep. of Germany ...... | 351/169 |
| WO86/01309 | 2/1986 | PCT Int'l Appl. ................. | 351/169 |
| 790310 | 2/1958 | United Kingdom ............... | 351/169 |
| 2056106 | 3/1981 | United Kingdom ............... | 351/169 |
| 2069714 | 8/1981 | United Kingdom ............... | 351/169 |
| 2146791 | 4/1985 | United Kingdom ............... | 351/169 |

Primary Examiner—John K. Corbin
Assistant Examiner—Scott J. Sugarman
Attorney, Agent, or Firm—Burns, Doane, Swecker & Mathis

[57] ABSTRACT

A multifocal lens has an upper distance vision zone which is divided by a visible division from a distinct lower portion of the lens which includes an intermediate vision zone of progressively increasing dioptric power which leads into a near vision zone. The visible division is provided by an abrupt change in dioptric power in the range from about 0.5 dioptres to about 0.5 dioptres less than the difference between the constant dioptric powers of the near vision zone and the distance vision zone.

6 Claims, 1 Drawing Sheet

MULTIFOCAL LENS

FIELD OF THE INVENTION

This invention relates to multifocal ophthalmic lenses used for vision over a range of distances.

BACKGROUND OF THE INVENTION

The ability of the human eye to adjust itself for varying object distances is known as accommodation. As the human eye ages, the ability to adjust decreases. There then exists, for the ageing eye, a range of indistinct vision for near and intermediate tasks which increases with age and with decreasing accommodation.

The most common means devised to decrease or eliminate this range of indistinct vision are reading lenses, bifocal lenses, trifocal lenses, and progressive lenses.

Reading lenses have a single dioptric power to assist the eye to provide a range of clear vision for near tasks. This range of clear vision decreases with age and the range of distinct vision recedes so that even when the spectacles are removed there is a range of intermediate distance where vision is indistinct.

Bifocal lenses are provided when the wearer requires correction of distance vision as well as assistance for near tasks. In a bifocal lens, two separate zones of different dioptric focal power are provided. The range within which objects can be seen clearly through the distance vision zone does not overlap with the range within which the objects can be seem clearly through the near vision zone when the wearer is above the age of 45 to 50 years, even when a major part of the available accommodation is used.

Trifocal lenses have a third zone of a dioptric power intermediate between that of the distance vision zone and that of the near vision zone, interposed between those zones to extend into the intermediate region the range over which objects can be clearly seen. However, for wearers over about 60 years of age there is still a considerable range of indistinct vision between the near limit of the distance vision range and the far limit of the range of the intermediate zone.

The problem to be solved stems from the lack of a continuous range of vision for all distances. One solution for this has been the development of progressive lenses as described for example in U.S. Pat. No. 2,869,422. In these progressive lenses an intermediate zone is interposed between the distance vision zone and the near vision zone and progresses smoothly in increasing dioptric powers from that of the distance vision zone to that of the near vision zone. However, because of the kind of aspheric surfaces associated with them, all progressive lenses contain inherently unavoidable and unwanted astigmatism and distortion particularly in the peripheral portion of the intermediate transition zone.

This unwanted astigmatism causes a waving or rocking effect when the wearer's head is moved or when objects move in relation to the wearer, and this form of progressive lens has been unacceptable to many potential wearers because the wearing of such lenses can produce nausea or disorientation. A further disadvantage of this form of progressive lens is that the width of field for vision through the intermediate zone and the vision zone is relatively narrow. This is a constraint to natural lateral vision and forces the wearer to direct his gaze through the central area of the intermediate zone and the near vision zone.

A further disadvantage of progressive lenses is that the rate of change of dioptric power along the eye path or centre-line of the corridor along which the line of vision moves, is often so great that the power change over the aperture of the pupil causes a blurred image to be seen by the wearer when viewing objects at intermediate distances.

The development of progressive power lenses has been described by A. G. Bennett in a series of articles in "The Optician" (October, November 1970, February and March 1971).

Attempts have been made by designers of progressive lenses to reduce the degree or effect of the unwanted astigmatism. For example the lenses described in GB-A-2,056,106, GB-A-2,069,714, and U.S. Pat. No. 4,056,311 concentrate the astigmatism into relatively unused portions of the lens. Other designers have attempted to spread the astigmatism over a larger portion of the lens, thus decreasing the maximum value of astigmatism, as in the comparative examples of U.S. Pat. No. 4,315,673. However, it has not been possible to avoid the image degrading effects caused by the degree or distribution of this unwanted astigmatism.

GB-A-790,310 describes an ophthalmic lens whose lower portion forms a progressive surface which may blend with an upper distance vision zone of constant power, or may be cut locally to form a progressive surface of reduced area.

It is a main object of the invention to provide a multifocal lens which provides clear vision for intermediate distances up to the full range between the distance vision an near vision ranges, but which has considerably lower levels of astigmatism and distortion than conventional progressive lenses, and in which the eye path width and reading zone widths can be made significantly greater than with conventional progressive lenses.

SUMMARY OF THE INVENTION

A multifocal lens of the invention may have at least three viewing zones including two zones of constant dioptric power, one of which zones has a power value greater than the other, and a zone of progressively increasing power. There may be a visible division between the zone of least dioptric power and the zone of progressively increasing power provided by an abrupt change in dioptric power in the range from about 0.5 dioptres to about 0.5 dioptres less than the power difference between the zones of constant dioptric power.

In particular the invention provides a multifocal lens having a distance vision zone, a near vision zone, and an intermediate zone of progressively increasing power, with a visible division between the distance vision zone and the intermediate vision zone defined by an abrupt change in dioptric power in the range from about 0.5 dioptres to about 0.5 dioptres less than the power difference between the distance vision zone and the near vision zone.

In one embodiment the visible division extends across the full width of the lens and divides the lens into two distinct portions.

In another embodiment a visible segment is provided within the lens, which segment incorporates a near vision zone and the zone of progressively increasing power which is uppermost in the segment, and the visible boundary forms the upper boundary of the segment and does not extend across the full width of the lens, the remainder of the lens forming a distance vision zone.

Preferably the average rate of change of power in the zone of progressively increasing power is selected from the range of about 0.03 to about 0.25 dioptres/mm.

In each embodiment the zone of progressively increasing power may be chosen to have a shape produced by the design procedures as herein described.

gree of astigmatism, and makes possible a relatively wide eye path corridor. The otherwise large levels of astigmatism are placed outside the boundary of the segment 4 and are removed altogether because the distance vision zone 1 of constant dioptric power entirely surrounds the segment 4.

Table 1 sets out design details for a series of lenses which achieve distinct vision over the full range of viewing distances.

TABLE 1

| Power Difference between near zone and distance zone (dioptres) | Power Change at division (dioptres) | Progressive Power Change in Intermediate zone (dioptres) | Length of Intermediate zone (mm) | Average rate of change of power along the intermediate zone (dioptres/mm) |
| --- | --- | --- | --- | --- |
| 1.50 | 1.00 | 0.50 | 10 | .05 |
| 1.75 | 1.00 | 0.75 | 10 | .075 |
| 2.00 | 1.00 | 1.00 | 10 | .10 |
| 2.25 | 1.00 | 1.25 | 12 | .10 |
| 2.50 | 0.87 | 1.63 | 12 | .14 |
| 2.75 | 0.75 | 2.00 | 12 | .17 |
| 3.00 | 0.75 | 2.25 | 12 | .19 |

BRIEF DESCRIPTION OF THE DRAWINGS

Some embodiments of the invention will now be described, by way of example with reference to the accompanying drawings in which.

DETAILED DESCRIPTION

Figure 1:
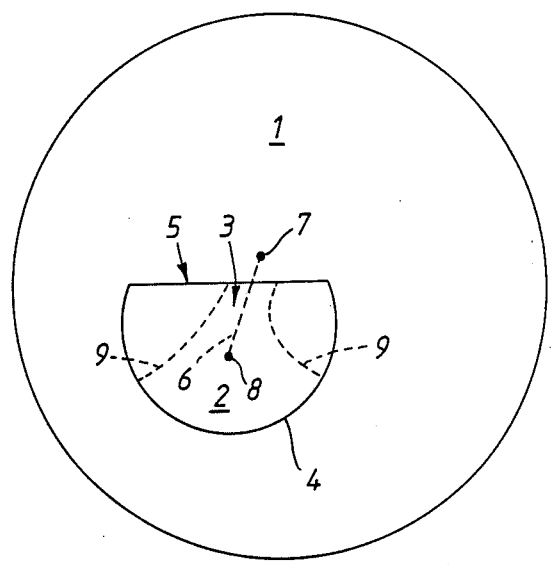
FIG. 1 illustrates a front elevation of one form of multifocal lens according to the invention.

Referring to the drawings, FIG. 1 is a front elevation of a multifocal lens which has three viewing zones which are a distance vision zone 1 of constant dioptric power, a near vision zone 2 also of constant dioptric power and having a power value greater than the distance vision zone 1, and an intermediate zone 3 of progressively increasing power.

The near vision zone 2 and the intermediate zone 3 are incorporated in a visible segment 4. The upper boundary 5 of the segment 4 is a visible division 5 between the distance vision zone 1 and the zone 3 of progressively increasing power. This division 5 can be straight, as shown, or gently curved. The line 6 represents the centre line of the eye path or corridor which extends across the intermediate zone 3 from the distance visual point 7 to the near visual point 8. The dotted lines 9 represent the invisible lateral boundaries of the zones 3. As the eye moves along the eye path 6 from the distance vision zone 1 across the division 5, which is the upper boundary of the segment 4, there may be an abrupt change or step in the dioptric power at the visible division 5 in the range of about 0.5 dioptres to about 0.5 dioptres less than the power difference between the distance vision zone 1 and the near vision zone 2.

The choice of the size of the abrupt change in dioptric power depends on the difference between the constant values of dioptric power of the distance vision zone 1 and the near vision zone 2, and on the degree to which it is desired to provide a range of distinct vision intermediate between the range of distance vision and the range of near vision. Further, this abrupt change in dioptric power across the division 5 permits a smaller range of dioptric power change progressively across the intermediate zone 3 from the division 5 to the near vision zone 2. This reduces the progressive rate of change of power in the intermediate zone and the de- The length of the intermediate zone 3, in the fourth column of Table 1, is determined using a vertometer to identify the lower edge of the intermediate zone where the line of sight of the eye moves from the varying dioptric power of the intermediate zone 3 to the constant dioptric power of the near vision zone 2. There is a smooth blending of the two zones at this lower edge which is usually from about 10 mm to about 16 mm below the visible division 5.

It is possible to choose an abrupt change in dioptric power greater than the values shown in the second column of Table 1, when some distinct vision in the intermediate range can be sacrificed, in order to give a reduced range of progressively changing dioptric power in the intermediate zone which can lead to shortening of the length of the intermediate zone, widening of the eye path corridor across the intermediate zone, or to a reduction in the level of astigmatism. Also the reduced progressive rate of change of dioptric power reduces the vertical change in power over the pupil aperture which improves the quality of the image formed when viewing objects at intermediate distances. This sacrifice of some distinct vision in the intermediate range would mean that vision would gradually become indistinct, as the eye travels along the eye path from 8 to 7 just below the division 5, for distances which are close to the range of clear distance vision.

The average rate of change of dioptric power in the intermediate zone can be in the range of about 0.03 to about 0.25 dioptres/mm, and is preferably in the range of about 0.05 to about 0.2 dioptres/mm. For any one lens design, the value in this range is chosen in dependence on how much of the change in dioptric power from the distance vision zone 1 to the near vision zone 2, occurs in the step across the visible division 5, and on the length of the intermediate zone 3.

Table 2 illustrates the improved characteristics of a multifocal lens of the kind illustrated in FIG. 1 as compared with a typical commercially-available progressive lens of the kind described in EP-A2-0 132 955. Both lenses have a difference of about 2.5 dioptres between the distance vision zone and the near vision zone.

TABLE 2

| | Multifocal lens of present invention | Typical progressive lens |
|---|---|---|
| Max. level of astigmatism | 1.5 dioptres | 5.0 dioptres |
| Width of intermediate zone corridor | 3.5 mm | 2.5 mm |
| Width of near vision zone | 25 mm | 17 mm |

Figure 2:
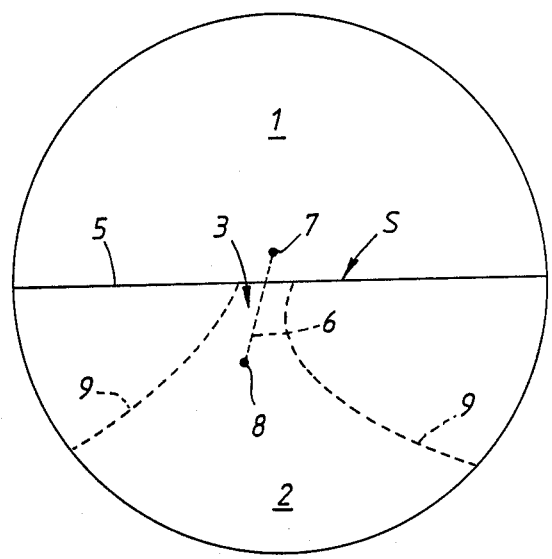
FIG. 2 is a view similar to FIG. 1 of another multifocal lens according to the invention.

Another form of multifocal lens according to the invention is shown in FIG. 2. In this lens the visible division 5 extends across the full width of the lens and divides the lens into two portions with the distance vision zone 1 entirely above the division 5, and the near vision zone 2 extending down to the bottom edge of the lens. The division 5 can be straight, as shown, or gently curved.

In designing and manufacturing a lens according to the invention, the procedures described in EP-A2-0 132 955 can be used. For example for designing a lens of the kind illustrated in FIG. 1, adjustment of the boundaries between the zones is effected in such a way that the most desirable combination of width of the segment 4, width of the eye path corridor and length of the intermediate zone is achieved, while areas of large astigmatism and distortion are removed from the segment area and therefore from the entire lens.

Using a porous ceramic former 10 is prepared by the technique described in the above mentioned EP-A2-0 132 955. The shape of the required three dimensional surface 11 is mathematically derived to provide height values for a multiplicity of parts, for example at 1 mm centres. Then, by means of a numerically controlled milling machine, there is produced in the porous refractory former a surface configured to correspond to those height values. The porous ceramic former can then used to form a glass mould part which is then used for casting the lens by a conventional lens casting process.

With lenses according to the invention vertical and horizontal fitting with respect to pupil positions is much simpler than with the commercially available progressive lenses.

For vertical fitting the segment appears at the correct height in the frame with respect to pupil height while the division 5 is maintained horizontal. This procedure is the same as for standard flat top or curved top or executive bi-focal lenses and no surface markings are required.

Horizontal fitting is simplified because the eye path or corridor is in a fixed constant position in the segment 4. This means that the centre line 6 of the corridor can be made to coincide with the eye path by fixing the segment horizontally in a manner similar to the method usually used for the fitting of bi-focal lenses and without the need to follow surface markings.

It will be appreciated that the present invention can be embodied in other specific forms without departing from the spirit or essential characteristics thereof. The presently disclosed embodiments are therefor considered in all respects to be illustrative and not restrictive. The scope of the invention is indicated by the appended claims rather than the foregoing description, and all changes that come within the meaning and range of equivalents thereof are intended to be embraced therein.

We claim:

1. A multifocal lens having at least three viewing zones including distance and near vision zones of constant dioptric power and a zone of progressively increasing dioptric power, said distance vision zone having a dioptric power less than the dioptric power of said near vision zone, there being a visible division between said distance vision zone and said zone of progressively increasing dioptric power provided by an abrupt change in dioptric power in the range from about 0.5 dioptres to about 0.5 dioptres less than the difference between the dioptric powers of said near and distance vision zones.

2. A multifocal lens as claimed in claim 1, wherein the average rate of change of dioptric power in said zone of progressively increasing dioptric power is selected from the range of about 0.03 to about 0.25 dioptres/mm.

3. A multifocal lens having at least three vision zones wherein:
a visible segment is provided within the lens which segment incorporates a near vision zone of constant dioptric power and an intermediate vision zone of progressively increasing dioptric power which leads from the upper boundary of said segment into said near vision zone;
said upper boundary of said segment does not extend across the full width of the lens;
the remainder of the lens forms a distance vision zone of constant dioptric power less than the dioptric power of said near vision zone; and
said upper boundary of said segment is formed by a visible division between said distance vision zone and said intermediate vision zone, which division provides an abrupt change in dioptric power in the range from about 0.5 dioptres to about 0.5 dioptres less than the difference between the constant dioptric powers of said near and distance vision zones.

4. A multifocal lens comprising:
a distance vision zone of constant dioptric power which forms an upper portion of the lens;
a visible division extending across the full width of the lens and dividing said upper portion from a distinct lower portion of the lens;
an intermediate vision zone of progressively increasing dioptric power and a near vision zone of constant dioptric power provided within said lower portion of the lens, with said intermediate vision zone leading from said visible division into said near vision zone; and
said visible division being provided by an abrupt change in dioptric power in the range from about 0.5 dioptres to about 0.5 dioptres less than the difference between the dioptric powers of said near vision zone and said distance vision zone.

5. A multifocal lens as claimed in claim 3 or claim 4, wherein the average rate of change of dioptric power in said intermediate vision zone is selected from the range of about 0.03 to about 0.25 dioptres/mm.

6. A multifocal lens having a distance vision zone, a near vision zone, and an intermediate zone of progressively increasing power, with a visible division between said distance vision zone and said intermediate vision zone defined by an abrupt change in dioptric power in the range from about 0.5 dioptres to about 0.5 dioptres less than the power difference between said distance vision zone and said near vision zone.

* * * * *